United States Patent [19]
Mattavi

[11] 3,754,398
[45] Aug. 28, 1973

[54] THERMAL ENGINE EXHAUST REACTOR WITH OVER-TEMPERATURE PROTECTION
[75] Inventor: James N. Mattavi, Mt. Clemens, Mich.
[73] Assignee: General Motors Corporation, Detroit, Mich.
[22] Filed: Dec. 27, 1971
[21] Appl. No.: 211,972

[52] U.S. Cl.................... 60/298, 23/277 C, 252/70
[51] Int. Cl............................................. F01n 3/00
[58] Field of Search...................... 60/298, 274, 320, 60/200 A, 267, 282; 123/41.16; 415/114; 416/96; 23/277 C; 252/70

[56] References Cited
UNITED STATES PATENTS
| | | | |
|---|---|---|---|
| 2,574,190 | 11/1951 | New | 415/114 |
| 2,956,637 | 10/1960 | Lemmerman | 165/135 |
| 3,137,132 | 6/1964 | Turkat | 60/200 A |
| 3,470,689 | 10/1969 | Gurr | 55/DIG. 30 |
| 3,645,093 | 2/1972 | Thomas | 60/298 |
| 3,665,711 | 5/1972 | Muroki | 60/298 |

Primary Examiner—Douglas Hart
Attorney—J. L. Carpenter, Robert J. Outland et al.

[57] ABSTRACT

A thermal reactor preferably having in a preferred embodiment, an insulated reaction chamber in which engine exhaust gases are exothermically reacted to reduce undesirable exhaust emissions. The inner liner of the reaction chamber is protected against overheating during temporary periods of excessive temperature operation by surrounding the outer surfaces of the liner with a fusible material having a melting point between the normal operating temperature of the reactor and the maximum operating temperature. The latent heat of fusion of the fusible material acts as a heat sink, absorbing heat upon melting of the material so as to maintain the walls of the inner liner below their maximum operating temperatures during temporary periods of abnormally high temperature operation due to engine malfunction or the like.

3 Claims, 2 Drawing Figures

Patented Aug. 28, 1973

3,754,398

INVENTOR.
James N. Mattavi
BY
Robert J. Outland
ATTORNEY

THERMAL ENGINE EXHAUST REACTOR WITH OVER-TEMPERATURE PROTECTION

BACKGROUND OF THE INVENTION

A number of types of what might be termed thermal reactors are in use or are proposed for use in conjunction with the internal combustion engines of automotive vehicles to cause or encourage exothermic reactions of the exhaust gases in which undesirable constituents are burned or otherwise removed therefrom. Such thermal reactors include, for example, so-called exhaust reactors involving enlarged chambers in which combustion takes place, catalytic converters which include means for encouraging the reaction of combustibles with the aid of a catalyst and exhaust reverters involving, for example, the reduction of oxides of nitrogen in a catalyst encouraged reaction.

An operating problem which may be encountered with thermal reactors is the problem of temporary operation at excessive temperatures with the possibility of resultant damage to the reactor unit. In engine manifold reactors, for example, excessively rich carburetion of the engine or a misfiring cylinder can substantially increase the unburned hydrocarbons in the engine exhaust which, when burned in the reactor, may increase internal temperatures beyond safe operating limits, resulting in damage to the reactor structure itself and possible failure of the unit. The cost and inconvenience of such failures makes desirable the provision of means for preventing such over-temperature conditions or protecting the thermal reactor, of whatever type, against failure due to such high temperature operation until the cause can be corrected.

SUMMARY OF THE INVENTION

The present invention provides means for protecting the structure of thermal reactors of various types against damage due to temporary periods of operation at excessive temperatures. The protection means involves the provision of a fusion material, surrounding the inner liner of the reactor, which melts during high temperature operation acting as a heat sink to absorb heat from the walls of the inner liner, thereby protecting the walls against reaching excessive temperatures.

Various other features and advantages of the invention will be more apparent from the following description of certain preferred embodiments, taken together with the accompanying drawing.

DESCRIPTION OF THE PREFERRED EMBODIMENTS

Figure 1:
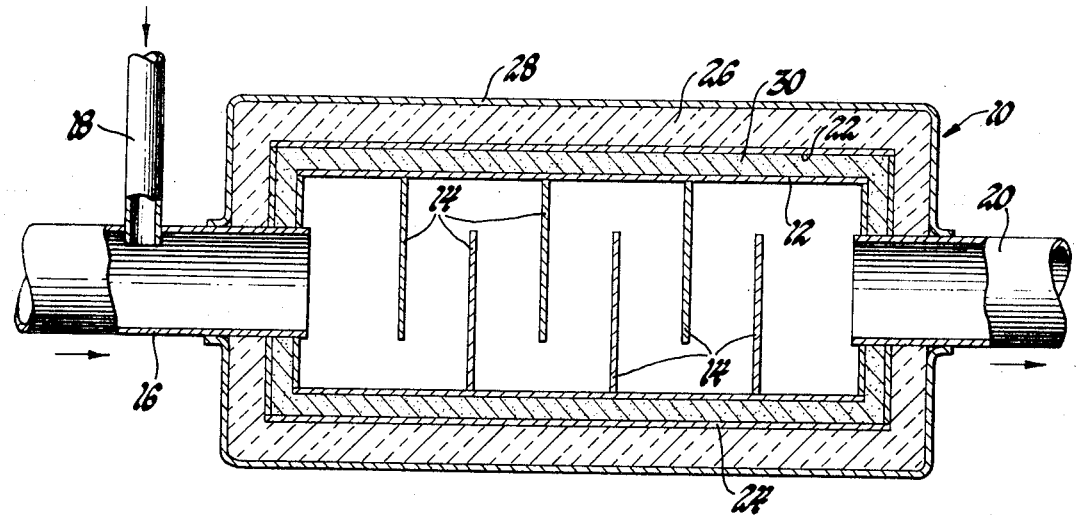
FIG. 1 is a diagrammatic cross-sectional view of one embodiment of exhaust reactor having protection means according to the invention.

In FIG. 1 of the drawing, numeral 10 generally indicates, in diagrammatic fashion, a thermal reactor which may be of any suitable type but, in the present instance, is of the type commonly referred to as an exhaust reactor. In such exhaust reactors, burning of combustibles present in the exhaust gases of an internal combustion engine in the presence of excess air is encouraged through extended residence time within an insulated chamber.

Reactor 10 includes an inner reaction-chamber-defining liner 12 having attached thereto a plurality of baffles 14 which together define an extended gas flow path through the reaction chamber. One or more inlet connections 16 are provided which connect the reaction chamber with the exhaust gas outlet ports of an internal combustion engine, not shown. An air supply tube 18 connects with the inlet connection 16 and with a source of air such as an engine driven air pump to supply excess air for mixing with the engine exhaust gases delivered to the exhaust reactor for combustion therein. An outlet connection 20 at the opposite end of the reaction chamber from the inlet connection provides a path for the removal of treated exhaust gases from the reactor and would normally be connected with the vehicle muffler or the like.

Surrounding the inner liner 12 of the reactor is an enclosed chamber 22 outwardly defined by a housing or intermediate wall 24. A body of suitable insulation material 26 surrounds the intermediate wall 24 and is retained in place by an outer shell 28.

The interior of the enclosed chamber 22 is substantially filled with a fusible heat-absorbing material 30, such as, for example, magnesium fluoride or magnesium silicide, the selection of a material being dependent on the desired normal and maximum operating temperatures of the units. The fusible material is arranged to contact the outer surfaces of the inner liner 12. Upon reaching its melting temperature, the material acts as a heat sink, absorbing heat from the inner liner as it melts.

Preferably the fusible material is selected to have a high latent heat of fusion so that it will provide a relatively large heat capacity. In order to provide the desired protection for the inner liner, the fusible material must be selected to have a melting temperature which is higher than that reached during operation of the reactor under normal conditions so that the material will remain solid under such conditions. The melting temperature must, however, be below the temperatures reached during operation of the reactor at abnormally high temperatures which would otherwise cause damage to the interior walls of the reactor chamber. In this way the melting of the fusible material under high temperature conditions will draw heat from the walls of the inner liner protecting it against the damage until all of the fusible material has been melted.

Suitable indicating means may be provided in conjunction with the reactor to warn the vehicle operator of the abnormal operating condition so that the condition may be corrected before the temporary protection supplied by melting of the fusible material is exhausted and permanent damage to the reactor occurs.

Figure 2:
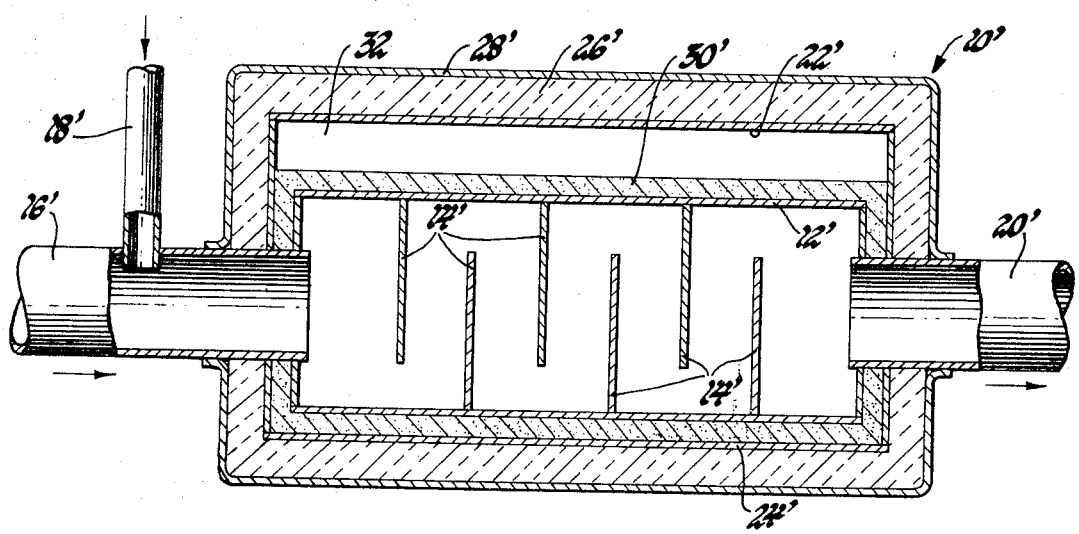
FIG. 2 is a view similar to FIG. 1 but showing an alternative embodiment of exhaust reactor according to the invention.

The embodiment of FIG. 2 is identical in most respects to the construction of FIG. 1 and, accordingly, primed numerals are utilized to identify the similar components. The difference in the embodiment of FIG. 2 is that an expansion space 32 is provided in the enclosed chamber 22' above the level of the fusible material 30' in its solid state so as to provide room for expansion of the volume of the fusible material when it is changed to its liquid state.

Suitable materials for use in thermal reactors of high temperature stainless steel construction or the like may be, for example, metallic salts, examples of which are magnesium fluoride which has a melting temperature of 2,303° F. and magnesium silicide which has a melting temperature of 2,012° F. It is apparent that numerous other fusible materials might be appropriate for use to provide the necessary heat sink in a particular reactor design, depending upon the normal and maximum operating temperatures as previously noted.

While the invention has been described by reference to certain preferred embodiments chosen for purposes of illustration, it is intended that the invention not be limited except by the language of the following claims.

I claim:

1. For use with an internal combustion engine a thermal reactor device for removing undesirable substances from the engine exhaust gases, said thermal reactor comprising
   an inner liner defining a high temperature reaction chamber,
   an outer housing, spacedly surrounding said inner liner and defining an enclosed space therebetween, and
   a fusible heat absorbing material within said enclosed space and contacting the outer surfaces of said inner liner that are exposed to said space, said heat absorbing material being selected from the group of metal salts consisting of magnesium fluoride and magnesium silicide and having a melting temperature which is greater than the normal operating temperature of the inner liner surfaces it contacts and which is below the desired maximum operating temperatures of said surfaces whereby, during operation of said thermal reactor at excessive reaction temperatures, said inner liner wall is maintained below its maximum operating temperature by melting of said fusible material.

2. The reactor of claim 1 wherein said enclosed space between said inner liner and outer housing includes an expansion volume above the level of said inner liner to provide for expansion of said fusible material due to a change of state.

3. The reactor of claim 1 and further comprising heat insulating means surrounding said outer housing and adapted to prevent excessive heat flow therefrom.

* * * * *